United States Patent
Ferenz et al.

(10) Patent No.: US 9,540,500 B2
(45) Date of Patent: Jan. 10, 2017

(54) PRODUCTION OF POLYETHER SILOXANES

(71) Applicant: Evonik Degussa GmbH, Essen (DE)

(72) Inventors: Michael Ferenz, Essen (DE); Stephan Hofmann, Moenchengladbach (DE); Horst Dudzik, Essen (DE); Carsten Schiller, Ratingen (DE)

(73) Assignee: EVONIK DEGUSSA GMBH, Essen (DE)

( * ) Notice: Subject to any disclaimer, the term of this patent is extended or adjusted under 35 U.S.C. 154(b) by 0 days.

(21) Appl. No.: 14/959,461

(22) Filed: Dec. 4, 2015

(65) Prior Publication Data

US 2016/0160009 A1    Jun. 9, 2016

(30) Foreign Application Priority Data

Dec. 5, 2014  (EP) ................... 14196425

(51) Int. Cl.
*C08G 77/08* (2006.01)
*C08K 5/544* (2006.01)
*C08G 77/46* (2006.01)
*C08G 77/12* (2006.01)

(52) U.S. Cl.
CPC .............. *C08K 5/544* (2013.01); *C08G 77/08* (2013.01); *C08G 77/46* (2013.01); *C08G 77/12* (2013.01)

(58) Field of Classification Search
CPC ...................................................... C08G 77/08
USPC ............................................. 528/15, 25, 31
See application file for complete search history.

(56) References Cited

U.S. PATENT DOCUMENTS

| | | | |
|---|---|---|---|
| 4,292,434 A | 9/1981 | Lindner et al. |
| 4,847,398 A | 7/1989 | Mehta et al. |
| 6,303,533 B1 | 10/2001 | Grosch et al. |
| 7,157,541 B2 | 1/2007 | Knott et al. |
| 7,605,284 B2 | 10/2009 | Brueckner et al. |
| 7,635,581 B2 | 12/2009 | Ferenz et al. |
| 7,829,647 B2 | 11/2010 | Bruckner et al. |
| 7,834,122 B2 | 11/2010 | Ferenz et al. |
| 7,964,694 B2 | 6/2011 | Ferenz et al. |
| 8,138,294 B2 | 3/2012 | Henning et al. |
| 8,198,473 B2 | 6/2012 | Ferenz et al. |
| 8,420,748 B2 | 4/2013 | Henning et al. |
| 8,557,944 B2 | 10/2013 | Henning et al. |
| 8,598,295 B2 | 12/2013 | Henning et al. |
| 8,623,984 B2 | 1/2014 | Henning et al. |
| 8,729,207 B2 | 5/2014 | Hartung et al. |
| 8,778,319 B2 | 7/2014 | Herrwerth et al. |
| 8,779,079 B2 | 7/2014 | Henning et al. |
| 8,906,974 B2 | 12/2014 | Glos et al. |
| 8,916,511 B2 | 12/2014 | Maurer et al. |
| 8,946,310 B2 | 2/2015 | Glos et al. |
| 8,946,311 B2 | 2/2015 | Schiller et al. |
| 8,946,369 B2 | 2/2015 | Henning et al. |
| 8,957,009 B2 | 2/2015 | Schubert et al. |
| 8,957,121 B2 | 2/2015 | Schiller et al. |
| 2005/0075468 A1 | 4/2005 | Knott et al. |
| 2006/0155090 A1 | 7/2006 | Ferenz |
| 2008/0125503 A1 | 5/2008 | Henning et al. |
| 2012/0083620 A1 | 4/2012 | Ziche |
| 2012/0153210 A1 | 6/2012 | Glos et al. |
| 2012/0190760 A1 | 7/2012 | Henning et al. |
| 2012/0190762 A1 | 7/2012 | Hubel et al. |
| 2012/0282210 A1 | 11/2012 | Henning et al. |
| 2013/0035407 A1 | 2/2013 | Lobert et al. |
| 2013/0035409 A1 | 2/2013 | Hubel et al. |
| 2013/0259821 A1 | 10/2013 | Henning et al. |
| 2013/0331592 A1 | 12/2013 | Hartung et al. |
| 2013/0345318 A1 | 12/2013 | Schubert et al. |
| 2014/0256844 A1 | 9/2014 | Henning et al. |
| 2015/0057384 A1 | 2/2015 | Glos et al. |
| 2015/0080593 A1 | 3/2015 | Henning et al. |

FOREIGN PATENT DOCUMENTS

| | | |
|---|---|---|
| DE | 19918361 A1 | 10/2000 |
| DE | 102009027215 A1 | 12/2010 |
| EP | 0032377 B1 | 9/1984 |
| EP | 0862947 B2 | 4/2003 |
| EP | 2463291 A2 | 6/2012 |
| EP | 2628771 A1 | 8/2013 |

OTHER PUBLICATIONS

Edited by Hill, R.M., "Silicone Surfactants, Series: Surfactant Science", Jul. 13, 1999, p. 8, CRC Press.

*Primary Examiner* — Elvis O Price
(74) *Attorney, Agent, or Firm* — Scully, Scott, Murphy & Presser, P.C.

(57) ABSTRACT

Processes for producing polyether siloxanes are provided in which unsaturated polyethers are reacted with one or more SiH-functional siloxanes in the presence of Pt(0) compounds and tertiary amines Also, provided is the use of Pt(0) compounds and tertiary amines for producing polyether siloxanes and to the use of the polyether siloxanes thus obtained.

7 Claims, No Drawings

PRODUCTION OF POLYETHER SILOXANES

FIELD OF THE INVENTION

The present invention relates to processes for producing preferably low-viscosity polyether siloxanes in which unsaturated polyethers are reacted with one or more SiH-functional siloxanes in the presence of Pt(0) compounds and tertiary amines. The present invention further relates to the use of Pt(0) compounds and tertiary amines for producing preferably low-viscosity polyether siloxanes and to the use of the preferably low-viscosity polyether siloxanes thus obtained.

BACKGROUND

Polyether siloxanes are employed in a multitude of industrial processes, for example, as defoamers in fuels, as an additive in paints and coatings, and as a constituent of cosmetic formulations. Polyether siloxanes are also suitable for use as a polyurethane foam stabilizer. A multitude of different polyether siloxanes are marketed, for example, by Evonik Industries AG under the trade name Abil®.

Of particular importance are polyether siloxanes comprising polyether radicals linked to a siloxane backbone via SiC functions. Such polyether siloxanes may be produced by hydrosilylation of polyethers comprising terminal C—C double bonds with SiH-functional siloxanes. C—C double bond-containing polyethers may be produced, for example, by alkoxylation of allyl alcohol and are marketed as allyloxypolyethylene glycols. Typical representatives of this material class are, for example, those having CAS numbers 27274-31-3, 9042-19-7 and 9041-33-2.

The production of polyether siloxanes by hydrosilylation is a known process and has been described many times in the literature, for example in U.S. Pat. No. 7,157,541 and U.S. Patent Application Publication No. 2005/0075468. The catalysts typically employed for hydrosilylation are platinum compounds. In commercial practice the use of hexachloroplatinic acid and Karstedt's catalyst and/or formulations thereof has become established for this purpose.

Hydrosilylation is accompanied by a plurality of side reactions. In the presence of OH functions, dehydrogenative coupling of the OH group-bearing component and the SiH-functional siloxane takes place and SiOC functions are formed. Additionally, in the hydrosilylation of allyl group-containing compounds, rearrangement reactions and cleavage reactions occur and propionaldehyde is formed. Propionaldehyde is one component that can result in polyether siloxanes having a strong intrinsic odor.

The aldehyde liberated can further bring about linkage of two polyether siloxane molecules by reacting with OH groups belonging to the polyether radicals and bridging the radicals via acetal bridges.

The formation of SiOC functions and acetal bridges and further crosslinking reactions are generally unwanted since they result in the build-up of highly crosslinked structures. This results in increased product viscosities which markedly hampers processing of the polyether siloxanes and may impair performance. Depending on the extent of crosslinking, gel formation may even occur.

There are a multitude of patent documents concerned with controlling these side reactions.

U.S. Pat. No. 4,847,398 (Union Carbide Corporation, 1989) describes a solvent-free process for producing polyether siloxanes in the presence of a carboxylic acid or a carboxylic acid salt. The use of such additions controls the formation of polyether siloxanes bridged via acetal groups. The examples in U.S. Pat. No. 4,847,398 describe the use of a 3.3% solution of $H_2PtCl_6$ in 1,2-dimethoxyethane and ethanol (w(Pt)=1.6%). The concentration of the assistants is in the range of from 200 to 10 000 ppm.

EP 2463291 (Shin-Etsu, 2012) describes hydrosilylation in the presence of a carboxamide, a mixture of a nitrile component and an aromatic hydroxy component or a carboxamide salt. The additions are added with the aim of improving the selectivity of the hydrosilylation. The teaching of EP2463291 warns against the use of tertiary amines because they act as a catalyst poison.

DE 102009027215 discloses hydrosilylation with Pt(0) complexes in the presence of amine-N-oxides. Pt (0) catalysts having a platinum content in the range of 0.5-5% are particularly preferred in DE 102009027215.

EP 0032377 (Union Carbide, 1992) describes hydrosilylations in the presence of sterically hindered amines and phosphines. Sterically hindered amines are considered to be amines possessing at least one alkyl radical which comprises a secondary or tertiary carbon atom bonded directly to the amine nitrogen. It is further described that the addition of such amines controls side reactions without impairing the reactivity of platinum catalysts. A series of non-inventive examples shows that various tertiary amines, such as triethylamine, markedly reduce the reactivity of the platinum catalyst.

DE 102009027215 describes hydrosilylation of olefins with SiH group-comprising compounds in the presence of Pt(0) complexes and at least one amine oxide.

The reduction in catalyst activity is an unsolved problem for those skilled in the art. Moreover, the sometimes very high viscosity of the hydrosilylation products, which is caused by the long reaction time of catalyst systems having a relatively low activity, has not been satisfactorily avoided either.

SUMMARY OF THE INVENTION

The present invention provides hydrosilylation processes with Pt(0) compounds as catalyst where the catalyst activity is not reduced and rapid reaction is thus made possible. The present invention also provides a process for producing preferably low-viscosity polyether siloxanes which have in particular a low viscosity.

The processes of the present invention afford in particular polyether siloxanes having a comparably low viscosity because an effective way to control molecular weight-increasing side reactions was found which simplifies the processing and handling of the polyether siloxane.

It has now been found that, surprisingly and against the general teaching, tertiary amines of general formula 1 may be added to the hydrosilylation of unsaturated polyethers with SiH-functional siloxanes without retarding, much less inhibiting, the hydrosilylation. The amines of formula 1, which formula is shown hereinbelow, simultaneously prevent the formation of acetal groups and thus make it possible to produce preferably low-viscosity polyether siloxanes

$R^1 = R^2$ or independently at each occurrence is H or a $C_1$ to $C_{14}$ alkyl radical, preferably $R^2$ or H or $C_1$ to $C_6$ alkyl radicals, more preferably methyl, ethyl or $R^2$ and most preferably $R^2$.

$R^2$ = independently at each occurrence is a $C_1$ to $C_{14}$ alkyl radical optionally bearing at least one OH group, preferably $C_1$ to $C_{14}$ alkyl radicals bearing one OH group, more preferably —$CH_2CH_2OH$, —$CH_2CH(CH_3)OH$ or

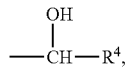

where $R^4$ = independently at each occurrence is a $C_2$ to $C_{12}$ hydrocarbon radical, preferably ethyl, it being most preferable when $R^2$ is independently at each occurrence —$CH_2CH_2OH$ and/or —$CH_2CH(CH_3)OH$.

The abovementioned amines of formula 1 are employed in below-described processes according to the present invention and thus make it possible to produce preferably low-viscosity polyether siloxanes.

A particularly preferred embodiment of the amine of general formula 1 is thus an amine of formula 1a

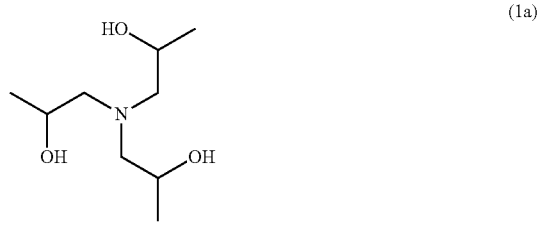

The use of amines of formula 1a makes it possible to achieve a particularly rapid reaction and affords products having a markedly lower viscosity compared to a process performed under identical conditions except for the omission of amines of formula 1. "Low-viscosity" polyether siloxanes in the context of the present invention is to be understood as meaning that the viscosities obtained in accordance with the invention are lower compared to those obtained when operating under identical conditions except for the omission of amines of formula 1.

The present invention thus provides a process for producing preferably low-viscosity polyether siloxanes, wherein the process comprises reacting
   a) one or more unsaturated polyethers with
   b) one or more SiH-functional siloxanes
   c) in the presence of
   d) Pt(0) compounds, and
   e) one or more tertiary amines of general formula 1 in the embodiments as described hereinabove, wherein the preferred embodiments of the components a), b) and c) are described hereinbelow. Processes according to the invention result in production processes with improved safety, improved ease of handling of the product and improved ease of incorporation into myriad industrial formulations.

As described hereinabove, reactions of unsaturated polyethers a) with SiH-functional siloxanes b) in the presence of Pt(0) compounds c) are generally known to those skilled in the art as hydrosilylation which is why this term is further used to describe processes according to the present invention as well.

DETAILED DESCRIPTION OF THE INVENTION

The processes according to the present invention are illustratively described hereinbelow without any intention to limit the invention to these illustrative embodiments. Where reference is made in what follows to ranges, general formulae or classes of compounds, these shall encompass not just the corresponding ranges or groups of compounds explicitly mentioned, but also all sub-ranges and sub-groups of compounds which are obtainable by extraction of individual values (ranges) or compounds. Where documents are cited in the context of the present description, the content thereof shall fully form part of the disclosure content of the present invention particularly in respect of the substantive matter in the context for which the document was cited. Percentages referred to hereinbelow are by weight unless otherwise stated. Average values referred to hereinbelow are number averages, unless otherwise stated. Physical properties specified below, such as viscosities or the like, for example, are physical properties measured at 25° C. unless otherwise stated. The viscosity is determined at a temperature of 25° C. and a shear rate of 10 l/s with an Anton Paar MCR 301 rheometer.

Preferred processes according to the invention employ 10-1000 ppm of one or more tertiary amines of general formula 1 (component c)), particularly preferably 100-500 ppm.

The reaction temperature is advantageously maintained in the range of 50-130° C. during the hydrosilylation according to the present invention. It is preferable when the reaction temperature is maintained in the range of from 60-99° C. For the purposes of this application, "during the hydrosilylation" is to be understood as meaning the stage of the reaction prior to a conversion of SiH groups of at least 90% being achieved. In order to rapidly achieve a higher final conversion of SiH groups, it may be advantageous to again raise the reaction temperature once a reaction conversion of more than 90% has been achieved.

Suitable monoolefinically unsaturated polyethers of component a) are polyethers comprising a terminal C—C double bond. These may be produced, for example, by alkoxylation of olefinically unsaturated alcohols, such as allyl alcohol, methylallyl alcohol, hexenol, glycerol monoallyl ether, eugenol and trimethylolpropane monoallyl ether.

A further method of producing monoolefinically unsaturated polyethers is alkoxylation of saturated alcohols followed by allylation of the OH functionalities. This method can also form, through the use of propylene oxide, for example, a certain proportion of a diolefinically unsaturated compound by rearrangement of propylene oxide into allyl alcohol and additional allylation of the allyl-functional polyether formed.

For the purposes of this invention, monoolefinically unsaturated polyether is to be understood as meaning that the numerical statistical average number of C—C double bonds comprised in each polyether chain is no more than 1.1.

Preferred polyethers are polyethers of general formula II

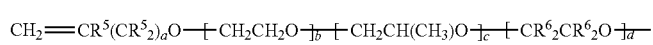

(II)

where
a=0 to 12, preferably 1 to 8, more preferably 1 to 4,
b=2 to 100, preferably 4 to 50, more preferably 5 to 35,
c=0 to 100, preferably 0 to 50, more preferably 2 to 35,
d=0 to 40, preferably 0 to 20, more preferably 0,
with the proviso that b+c+d≥3
where
$R^5$=identical or different $C_1$ to $C_8$ hydrocarbon radicals or H, preferably methyl, ethyl or H, more preferably H,
$R^6$=identical or different $C_1$ to $C_{12}$ hydrocarbon radicals or H, preferably methyl, ethyl, phenyl or H, it being preferable when at least 2 and preferably at least 3 radicals $R^6$ are H and the remaining radicals $R^6$ are ethyl or phenyl, and
$R^7$=identical or different $C_1$ to $C_{12}$ hydrocarbon radicals or C(O)Me or H, preferably methyl, butyl, —C(O)Me or H.

Alkoxylations may be performed in various ways. For instance, alkali-catalyzed alkoxylation is a frequently employed method. This uses strong bases, such as sodium methoxide, potassium methoxide or KOH as catalysts or initiators. A further possible method of producing suitable olefinically unsaturated polyethers is the alkoxylation of olefinically unsaturated alcohols with so-called double metal cyanide catalysts, such as are described, for example, in EP 862947.

The olefinically unsaturated polyethers may contain a series of by-products or secondary components depending on the way in which they are produced or worked up. For example, if sodium methoxide is used, alkoxylation of the methoxide group results in formation of polyethers comprising a methyl ether function. The polyethers may still contain certain concentrations of alkali metal salts which form from the initiator.

Once produced, the polyethers also often have stabilizers or other additives added to them, for example phenol derivatives, to avoid ageing of the products.

Suitable SiH-functional siloxanes of component b) are siloxanic organosilicon compounds comprising one or more SiH functions. Particularly suitable are compounds of general formula III

 (III)

$M=[R^8_3SiO_{1/2}]$ $M'=[R^8_2SiHO_{1/2}]$
$D=[R^8_2SiO_{2/2}]$ $D'=[R^8SiHO_{2/2}]$
$T=[R^8SiO_{3/2}]$ $Q=[SiO_{4/2}]$
where
e=0 to 10, preferably 0 to 2, more preferably 2,
f=0 to 10, preferably 0 to 2, more preferably 0,
g=0 to 500, preferably 2 to 300, more particularly 5 to 250,
h=0 to 100, preferably 0 to 50, more particularly 0 to 27,
i=0 to 10, preferably 0 to 5, more particularly 0,
j=0 to 10, preferably 0 to 5, more particularly 0,
with the proviso that e+f≥2 and f+h≥1, preferably≥2,
where
$R^8$=identical or different $C_1$ to $C_{30}$ hydrocarbon radicals, preferably methyl, ethyl, butyl or phenyl, more preferably methyl.

The description of siloxanes having M, D, T and Q units is described at length in the book Silicone Surfactants, Series: Surfactant Science, Published: Jul. 13, 1999 by CRC Press, Editor: Randall M. Hill, page 8.

There are various options for producing SiH-functional siloxanes. Owing to the way in which SiH-functional siloxanes are produced, they may contain various by-products. In addition to traces of moisture, acids, salts or solvents, the siloxane skeleton may also comprise functionalities not described in formula y. Hydrolytic cleavage of hydrogen can, for example, result in formation of SiOH functions. It may further be the case that alcohols are employed in the production process. The alcohols can react with the siloxane to form silylalkoxy functions.

Preferred catalysts are compounds where platinum is present in the oxidation state 0. The Pt(0) compounds of component c) are further described hereinbelow. The literature describes a series of platinum catalysts which are Pt(0) complexes and which are suitable for hydrosilylation of unsaturated polyethers with SiH-functional siloxanes. The catalyst known as Karstedt's catalyst is particularly widely used in industry. This is a Pt(0) complex where the ligand for the platinum atom is tetramethyldivinylsiloxane. It is particularly preferable to use Pt(0) compounds bearing tetramethyldivinylsiloxane as the ligand for the platinum atom, and/or Pt(PPh$_3$)$_4$.

The Pt preparation used may optionally comprise traces of platinum compounds having a non-zero oxidation state.

Here, the term traces is to be understood as meaning that less than 0.2% of the preparation is Pt atoms having a non-zero oxidation state. It is preferable when the mass fraction of Pt atoms having a non-zero oxidation state is less than 0.1%.

The platinum catalyst may be in a form where it is dissolved in a solvent. The catalyst may further be in a form where it is dispersed in a liquid. Examples of suitable solvents include polyethers, toluene or xylene.

Hydrosilylation:

In the context of the process for producing preferably low-viscosity polyether siloxanes, monounsaturated polyethers are hydrosilylated with siloxanes having multiple SiH functions in the presence of Pt catalysts and formula I amines according to the invention.

This is preferably achieved by contacting SiH siloxanes with monounsaturated polyethers, Pt(0) compounds, amine of formula I and optionally further substances or substance mixtures, for example solvents.

The process according to the present invention may be performed in various ways. Suitable production processes are continuous and semi-continuous processes as well as batchwise processes.

Commixing of the reactants may be effected in various ways. Thus, for instance, it is possible to stir the reactants with myriad stirring means or to effect commixing by pumped circulation of the reactants.

The reaction (hydrosilylation) is carried out at temperatures of 30-150° C. This reaction temperature during the hydrosilylation may be altered by cooling or heating.

Polyethers and SiH siloxanes are often only sparingly soluble in one another, if at all. Thus commixing of such feedstocks initially forms an emulsion. After metered addition of the Pt preparation, the reaction commences and the reaction mixture clarifies. In the context of this invention the time elapsed before the reaction mixture is clear is referred to as the clear point. In the context of a reproducible process, it is advantageous when the clear point is reached very quickly. In retarded hydrosilylations, a selection of different polyether species at the SiH siloxane may arise since the polyethers that are most compatible with the SiH siloxane react preferentially. When a lot of time passes before the clear point is reached, external parameters, such as the stirring intensity for example, may gain greater influence over product quality.

The present invention is illustratively described in the examples which follow without any intention of limiting the invention, whose scope is determined by the entire description and the claims, to the embodiments referred to in the examples.

The present invention further provides for the use of Pt(0) compounds and one or more tertiary amines of general formula 1

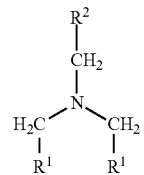

where
$R^1=R^2$ or independently at each occurrence H or a $C_2$ to $C_{14}$ alkyl radical,
$R^2=C_1$ to $C_{14}$ alkyl radicals bearing at least one OH group, for producing preferably low-viscosity polyether siloxanes, preferably from one or more unsaturated polyethers with one or more SiH-functional siloxanes. The embodiments cited as preferable hereinabove apply to the preferably employed Pt(0) compounds, two or more tertiary amines of general formula 1, unsaturated polyethers and SiH-functional siloxanes. It is particularly preferable when the radicals $R^2$ of the amines of general formula 1 are selected from —$CH_2CH_2OH$ and/or —$CH_2CH(CH_3)OH$.

The present invention further provides for the use of preferably low-viscosity polyether siloxanes preferably produced by a process according to the invention as defoamer, as polyurethane foam stabilizer or in personal care products.

EXAMPLES

Viscosity determination:

The viscosity of the samples was determined using a HAAKE Viscotester 550 viscosimeter. Viscosity measurements were carried out according to DIN 53019.

Determination of t (clear):

The time t (clear) was measured for one-pot reactions where the reactants form a milky emulsion after mixing. This is the time difference between adding the Pt preparation and the time point after which the reaction mixture became transparent. The smaller the t (clear) value, the greater must be the reactivity of the system since the reaction system clarifies only after a certain conversion is reached.

Experimental Series 1:

General procedure for producing a polyether siloxane with the aid of amine additions.

In a 500 mL three-necked flask with a thermometer, reflux cooler and KPG stirrer, 100 g of an SiH-functional siloxane of general formula [$Me_2SiHO_{1/2}$]$_2$ [$Me_2SiO_{2/2}$]$_{62}$[$MeSiHO_{2/2}$]$_6$ were admixed with 241 g of a polyether of general formula $CH_2$=$CHCH_2O[CH_2CH_2O]_{13}[CH_2CH(CH_3)O]_{13}H$. In each case, 0.17 g of an amine were added (see Table 1). The mixture was stirred and heated to 90° C. The reaction mixture was subsequently admixed with 0.17 g of a toluenic solution of Karstedt's catalyst (w(Pt)=2%). An exothermic reaction was observed. The mixture was stirred for two hours. This afforded a yellowish, clear, monophasic liquid.

| Experiment number | Amine addition | t (clear) | Viscosity |
|---|---|---|---|
| 1 (Comparative Example) | — | 10 min | 1350 mPa s |
| 2 (Comparative Example) | 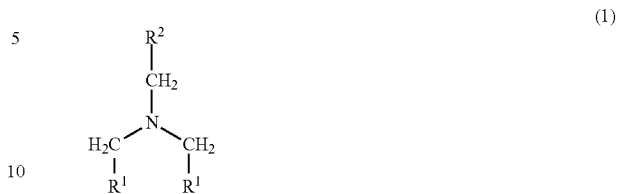 | 40 min | 1450 mPa s |
| 3 (inventive) | | 10 min | 1220 mPa s |
| 4 (Comparative Example) | | 10 min | 1320 mPas |

As described in EP2463291, it is apparent that triethylamine severely slows the reaction leading to the formation of products having a relatively high viscosity (experiment 2). HALS amines do not slow the reaction, but bring about only a slight reduction in viscosity by controlling the side reactions (experiment 4). However when amines according to the invention are added, products of markedly lower viscosity are obtained (experiment 3). Furthermore, the rate of reaction is not reduced.

While the present invention has been particularly shown and described with respect to preferred embodiments thereof, it will be understood by those skilled in the art that the foregoing and other changes in forms and details may be made without departing from the scope and spirit of the present invention. It is therefore intended that the present invention not be limited to the exact forms and details described and illustrated, but fall within the scope of the appended claims.

What is claimed as new is:

1. A process for producing polyether siloxanes, said process comprising:
   reacting
   a) one or more unsaturated polyethers with
   b) one or more SiH-functional siloxanes in the presence of
   c) Pt(0) compounds, and
   d) one or more tertiary amines of general formula 1

$$\begin{array}{c} R^2 \\ | \\ CH_2 \\ | \\ H_2C-N-CH_2 \\ | \quad\quad | \\ R^1 \quad\quad R^1 \end{array} \tag{1}$$

where
   $R^1 = R^2$ or independently at each occurrence is H or a $C_2$ to $C_{14}$ alkyl radical, and
   $R^2 = C_1$ to $C_{14}$ alkyl radicals bearing at least one OH group.

2. The process according to claim 1, wherein $R^2$ of the one or more amines of general formula 1 are $C_1$ to $C_{14}$ alkyl radicals each bearing precisely one OH group.

3. The process according to claim 1, wherein the radicals $R^1$ of the one or more amines of general formula 1 are the same as $R^2$.

4. The process according to claim 1, wherein the radicals $R^2$ of the one or more amines of general formula 1 are selected from —$CH_2CH_2OH$, —$CH_2CH(CH_3)OH$, and a combination of —$CH_2CH_2OH$ and —$CH_2CH(CH_3)OH$.

5. The process according to claim 1, wherein the one or more unsaturated polyethers of component a) are polyethers of general formula II $$CH_2=CR^5(CR^5_2)_aO-[CH_2CH_2O]_b-[CH_2CH(CH_3)O]_c-[CR^6_2CR^6_2O]_d-R^7 \tag{II}$$

where
   a=0 to 12,
   b=2 to 100,
   c =0 to 100, and
   d =0 to 40,
   with the proviso that b +c +d ≥3
where
   $R^5$ =identical or different $C_1$ to $C_8$ hydrocarbon radicals or H,
   $R^6$ =identical or different $C_1$ to $C_{12}$ hydrocarbon radicals or H, and
   $R^7$ =identical or different $C_1$ to $C_{12}$ hydrocarbon radicals or C(O)Me or H.

6. The process according to claim 1, wherein the one or more SiH-functional siloxanes of component b) are siloxanes of general formula III $$M_e M'_f D_g D'_h T_i Q_j \tag{III}$$

where
   M=[$R^8_3SiO_{1/2}$]  M'=[$R^8_2SiHO_{1/2}$]
   D=[$R^8_2SiO_{2/2}$]  D'=[$R^8SiHO_{2/2}$]
   T=[$R^8SiO_{3/2}$]  Q=[$SiO_{4/2}$] and e=0 to 10,
f=0 to 10,
g=0 to 500,
h=0 to 100,
i=0 to 10,
j=0 to 10
with the proviso that e+f≥2 and f+h ≥1,
where $R^8$ =identical or different $C_1$ to $C_{30}$ hydrocarbon radicals.

7. The process according to claim 1, wherein the Pt(0) compounds comprise Pt(0) compounds bearing tetramethyldivinylsiloxane, or $Pt(PPh_3)_4$.

* * * * *